(12) United States Patent
Komikado et al.

(10) Patent No.: US 8,713,279 B2
(45) Date of Patent: Apr. 29, 2014

(54) STORAGE SYSTEM WITH LU-SETTING FUNCTION

(75) Inventors: Kosuke Komikado, Odawara (JP); Yuko Matsui, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1023 days.

(21) Appl. No.: 12/276,520

(22) Filed: Nov. 24, 2008

(65) Prior Publication Data

US 2010/0082901 A1 Apr. 1, 2010

(30) Foreign Application Priority Data

Oct. 1, 2008 (JP) ................................. 2008-256313

(51) Int. Cl.
*G06F 12/00* (2006.01)

(52) U.S. Cl.
USPC .......................................................... 711/170

(58) Field of Classification Search
USPC .......................................................... 711/170
See application file for complete search history.

(56) References Cited

U.S. PATENT DOCUMENTS

| 5,129,088 | A  | * | 7/1992  | Auslander et al. ............... 711/1 |
| 6,779,095 | B2 | * | 8/2004  | Selkirk et al. ................. 711/165 |
| 6,880,058 | B2 |   | 4/2005  | Mizuno et al. |
| 7,130,960 | B1 |   | 10/2006 | Kano |
| 7,299,333 | B2 |   | 11/2007 | Mizuno et al. |
| 2005/0027938 | A1 | * | 2/2005 | Burkey ......................... 711/114 |
| 2007/0130423 | A1 | * | 6/2007 | Liu et al. ...................... 711/114 |

FOREIGN PATENT DOCUMENTS

| JP | 2002-236560 | 8/2002 |
| JP | 2006-302258 | 11/2006 |

OTHER PUBLICATIONS

English translation of Notification of Reasons for Refusal mailed Oct. 29, 2010 in Japanese Patent Publication No. 2008-256313.

* cited by examiner

*Primary Examiner* — Matthew Bradley
*Assistant Examiner* — Ramon A Mercado
(74) *Attorney, Agent, or Firm* — Brundidge & Stanger, P.C.

(57) ABSTRACT

In a storage system, an operator makes an input only of minimum-required information, and when an LU setting command including the information is accepted, in response to the LU setting command, any internal process is executed using configuration management information about an LU and a plurality of physical storage devices. After completion of the internal process, the processing result is forwarded back. Herein, the configuration management information is about the LU and the physical storage devices, including information about a free area and a free capacity in a storage space of each of the physical storage devices, and information about the LU based on the storage spaces. The free area is an address area occupied by the free space not used as the LU. The free capacity is the capacity of the free space. Accordingly, an LU setting technology with a reduced level of the operator's load of work can be favorably provided.

5 Claims, 21 Drawing Sheets

FIG. 2

| RG# | RG CAPACITY | HDD# | ADDRESS AREA | FREE AREA | FREE CAPACITY |
|---|---|---|---|---|---|
| 00 | 60 G | 00, 01, 02, 03, 04 | 0000 TO 5999 | 1000 TO 2999<br>3000 TO 4999 | 30 G |
| 01 | 80 G | 10, 11, 12, 13, 14 | 0000 TO 7999 | 3000 TO 3999<br>5000 TO 7999 | 40 G |
| .. | .. | .. | .. | .. | .. |

| Port ID | EXTERNAL LUN COMBINED LUN | EXTERNAL LUN HOST LUN | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| 00 | — | 00 | 00 | — | IN USE | 10 G | — | — | 0000 | 0000, ⋯ | 02 | 2000 TO 2999 |
| 00 | 01 | 01 | 01 | 3 | IN USE | 20 G | MASTER | — | 0000 | 0010, ⋯ | 03 | 0000 TO 1999 |
| 00 | 01 | 02 | 02 | 3 | IN USE | 30 G | SLAVE | 01 | 2000 | 2010, ⋯ | 03 | 4000 TO 6999 |
| 00 | 01 | 03 | 03 | 3 | IN USE | 20 G | SLAVE | 01 | 5000 | — | 04 | 2000 TO 3999 |
| ⋅⋅ | ⋅⋅ | ⋅⋅ | ⋅⋅ | ⋅⋅ | ⋅⋅ | ⋅⋅ | ⋅⋅ | ⋅⋅ | ⋅⋅ | ⋅⋅ | ⋅⋅ | ⋅⋅ |

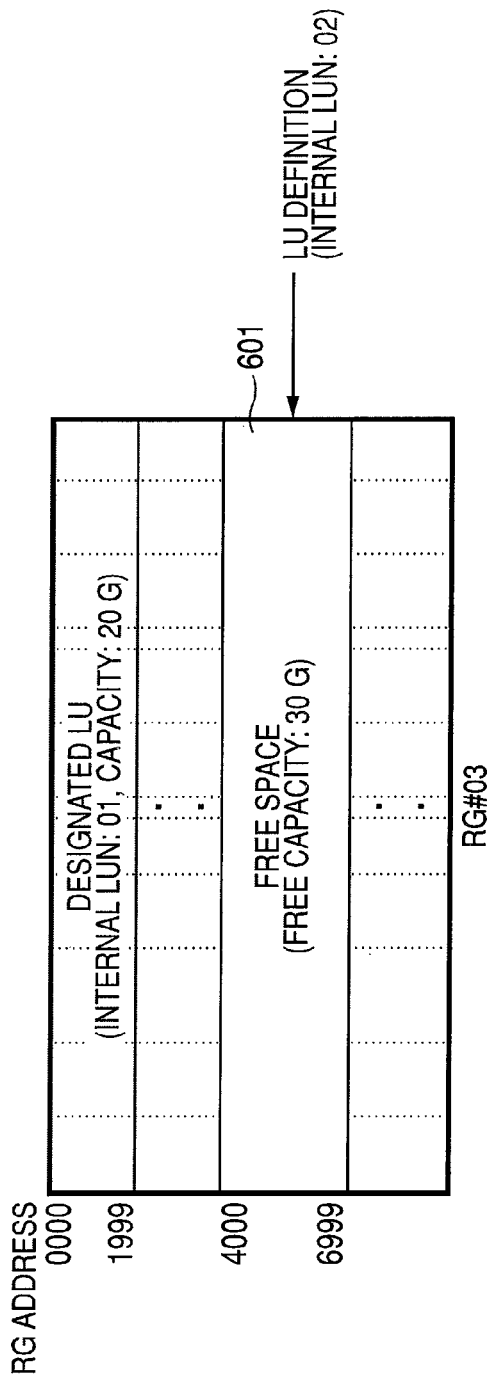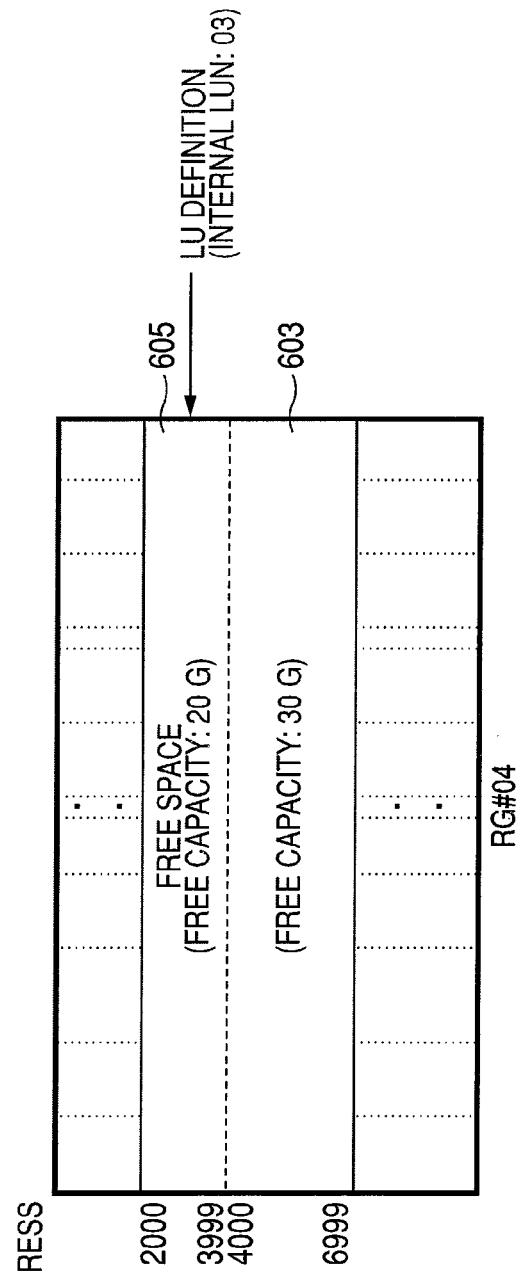

| RG# | RG CAPACITY | HDD# | ADDRESS AREA | FREE AREA | FREE CAPACITY |
|---|---|---|---|---|---|
| .. | .. | .. | .. | .. | .. |
| 03 | 100 G | 30, 31, 32, 33, 34 | 0000 TO 9999 | 4000 TO 6999 | 30 G |
| 04 | 100 G | 40, 41, 42, 43, 44 | 0000 TO 9999 | 2000 TO 6999 | 50 G |
| .. | .. | .. | .. | .. | .. |

| Port ID | EXTERNAL LUN | | INTERNAL LUN | THE NUMBER OF CONFIGURED LUs | STATUS | CAPACITY | TYPE | MASTER LUN | START LBA | FREE CAPACITY | UPDATE BLOCK | RG# | RG AREA |
| | COMBINED LUN | HOST LUN | | | | | | | | | | | |
|---|---|---|---|---|---|---|---|---|---|---|---|---|---|
| 00 | — | 00 | 00 | 1 | IN USE | 10 G | — | — | 0000 | 10 G | 0000, … | 02 | 2000 TO 2999 |
| 00 | 01 | 01 | 01 | 3 | IN USE | 20 G | — | — | 0000 | 20 G | 0010, … | 03 | 0000 TO 1999 |
| .. | .. | .. | .. | .. | .. | .. | .. | .. | .. | .. | .. | .. | .. |

| RG# | RG CAPACITY | HDD# | ADDRESS AREA | FREE AREA | FREE CAPACITY |
|---|---|---|---|---|---|
| . | . | . | . | . | . |
| 03 | 100 G | 30, 31, 32, 33, 34 | 0000 TO 9999 | — | 0 G |
| 04 | 100 G | 40, 41, 42, 43, 44 | 0000 TO 9999 | 2000 TO 6999 | 50 G |
| . | . | . | . | . | . |

| Port ID | EXTERNAL LUN | | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| | COMBINED LUN | HOST LUN | | | | | | | | | | |
| 00 | — | 00 | 00 | — | IN USE | 10 G | — | — | 0000 | 0000, ... | 02 | 2000 TO 2999 |
| 00 | — | 01 | 01 | — | DURING EXPANSION | 20 G | — | — | 0000 | 0010, ... | 03 | 0000 TO 1999 |
| 00 | — | 02 | 02 | — | DURING EXPANSION | 30 G | — | — | 2000 | — | 03 | 4000 TO 6999 |
| . | . | . | . | . | . | . | . | . | . | . | . | . |

| RG# | RG CAPACITY | HDD# | ADDRESS AREA | FREE AREA | FREE CAPACITY |
|---|---|---|---|---|---|
| . . | . . | . . | . . | . . | . . |
| 03 | 100 G | 30, 31, 32, 33, 34 | 0000 TO 9999 | — | 0 G |
| 04 | 100 G | 40, 41, 42, 43, 44 | 0000 TO 9999 | 4000 TO 6999 | 30 G |
| . . | . . | . . | . . | . . | . . |

| Port ID | EXTERNAL LUN | | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| | COMBINED LUN | HOST LUN | | | | | | | | | | |
| 00 | — | 00 | 00 | — | IN USE | 10 G | — | — | 0000 | 0000, ... | 02 | 2000 TO 2999 |
| 00 | — | 01 | 01 | — | DURING EXPANSION | 20 G | — | — | 0000 | 0010, ... | 03 | 0000 TO 1999 |
| 00 | — | 02 | 02 | — | DURING EXPANSION | 30 G | — | — | 2000 | — | 03 | 4000 TO 6999 |
| 00 | — | 03 | 03 | — | DURING EXPANSION | 40 G | — | — | 5000 | — | 04 | 2000 TO 3999 |
| . . | . . | . . | . . | . . | . . | . . | . . | . . | . . | . . | . . | . . |

| Port ID | EXTERNAL LUN | | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| | COMBINED LUN | HOST LUN | | | | | | | | | | |
| 00 | — | 00 | 00 | — | IN USE | 10 G | — | — | — | — | — | — |
| 00 | 01 | 01 | 01 | 3 | DURING EXPANSION | 20 G | MASTER | — | 0000 | 0000,··· | 02 | 2000 TO 2999 |
| 00 | 01 | 02 | 02 | 3 | DURING EXPANSION | 30 G | SLAVE | 01 | 0000 | 0010,··· | 03 | 0000 TO 1999 |
| 00 | 01 | 03 | 03 | 3 | DURING EXPANSION | 20 G | SLAVE | 01 | 2000 | — | 03 | 4000 TO 6999 |
| | | | | | | | | | 5000 | — | 04 | 2000 TO 3999 |
| ·· | ·· | ·· | ·· | ·· | ·· | ·· | ·· | ·· | ·· | ·· | ·· | ·· |

LU ADDRESS  
0000 — DESIGNATED LU (INTERNAL LUN: 01, CAPACITY: 20 G) — RG ADDRESS 0000  
1999 — 1999

LU ADDRESS  
0000 — MASTER LU (INTERNAL LUN: 01, CAPACITY: 20 G) — RG ADDRESS 0000 (RG#3)  
1999 — 1999  
2000 — SLAVE LU (INTERNAL LUN: 02, CAPACITY: 30 G) — 4000 (RG#3)  
4999 — 6999  
5000 — SLAVE LU (INTERNAL LUN: 03, CAPACITY: 20 G) — 2000 (RG#4)  
6999 — 3999

COMBINED LU

| RG ADDRESS | |
|---|---|
| 0000 | MASTER LU<br>(COMBINED LUN: 01, INTERNAL LUN: 01, CAPACITY: 20 G) |
| 1999 | |
| 4000 | SLAVE LU<br>(COMBINED LUN: 01, INTERNAL LUN: 02, MASTER LUN: 01, CAPACITY: 30 G) |
| 6999 | |

| RG ADDRESS | |
|---|---|
| 2000 | SLAVE LU<br>(COMBINED LUN: 01, INTERNAL LUN: 03, MASTER LUN: 01, CAPACITY: 20 G) |
| 3999 / 4000 | (FREE CAPACITY: 30 G) |
| 6999 | |

| RG# | RG CAPACITY | HDD# | ADDRESS AREA | FREE AREA | FREE CAPACITY |
|---|---|---|---|---|---|
| . . | . . | . . | . . | . . | . . |
| 03 | 100 G | 30, 31, 32, 33, 34 | 0000 TO 9999 | — | 0 G |
| 04 | 100 G | 40, 41, 42, 43, 44 | 0000 TO 9999 | 4000 TO 6999 | 30 G |
| . . | . . | . . | . . | . . | . . |

| Port ID | EXTERNAL LUN COMBINED LUN | EXTERNAL LUN HOST LUN | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| 00 | — | 00 | 00 | — | IN USE | 10 G | — | — | — | — | — | — |
| 00 | 01 | 01 | 01 | 3 | IN USE | 20 G | MASTER | — | 0000 | 0000, … | 02 | 2000 TO 2999 |
| 00 | 01 | 02 | 02 | 3 | IN USE | 30 G | SLAVE | 01 | 0000 | 0010, … | 03 | 0000 TO 1999 |
| 00 | 01 | 03 | 03 | 3 | IN USE | 20 G | SLAVE | 01 | 2000 | 2010, … | 03 | 4000 TO 6999 |
| . . | . . | . . | . . | . . | . . | . . | . . | . . | 5000 | — | 04 | 2000 TO 3999 |
| . . | . . | . . | . . | . . | . . | . . | . . | . . | . . | . . | . . | . . |

| RG# | RG CAPACITY | HDD# | ADDRESS AREA | FREE AREA | FREE CAPACITY |
|---|---|---|---|---|---|
| . . | . . | . . | . . | . . | . . |
| 03 | 100 G | 30, 31, 32, 33, 34 | 0000 TO 9999 | 5000 TO 6999 | 20 G |
| 04 | 100 G | 40, 41, 42, 43, 44 | 0000 TO 9999 | 2000 TO 6999 | 50 G |
| . . | . . | . . | . . | . . | . . |

| Port ID | EXTERNAL LUN COMBINED LUN | EXTERNAL LUN HOST LUN | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| 00 | – | 00 | 00 | – | IN USE | 10 G | – | – | 0000 | 0000, ··· | 02 | 2000 TO 2999 |
| 00 | 01 | 01 | 01 | 2 | DURING REDUCTION | 20 G | MASTER | – | 0000 | 0010, ··· | 03 | 0000 TO 1999 |
| 00 | 01 | 02 | 02 | 2 | DURING REDUCTION | 10 G | SLAVE | 01 | 2000 | 2010, ··· | 03 | 4000 TO 4999 |
| . . | . . | . . | . . | . . | . . | . . | . . | . . | . . | . . | . . | . . |

| Port ID | EXTERNAL LUN | | INTERNAL LUN | THE NUMBER OF CONFIGURED LUs | STATUS | CAPACITY | TYPE | MASTER LUN | START LBA | UPDATE BLOCK | RG# | RG AREA |
|---|---|---|---|---|---|---|---|---|---|---|---|---|
| | COMBINED LUN | HOST LUN | | | | | | | | | | |
| 00 | — | 00 | 00 | 1 | IN USE | 10 G | — | — | | | 02 | 2000 TO 2999 |
| 00 | 01 | 01 | 01 | 2 | IN USE | 20 G | MASTER | — | 0000 | 0000, ... | 03 | 0000 TO 1999 |
| 00 | 01 | 02 | 02 | 2 | IN USE | 10 G | SLAVE | 01 | 0000 | 0010, ... | 03 | 4000 TO 4999 |
| . . | . . | . . | . . | . . | . . | . . | . . | . . | 2000 | 2010, ... | 03 | |
| | | | | | | | | | . . | . . | . . | . . |

FIG. 16B

LU ADDRESS
0000
　　　MASTER LU
　　　(INTERNAL LUN: 01, CAPACITY: 20 G)
1999
2000
　　　SLAVE LU
　　　(INTERNAL LUN: 02, CAPACITY: 30 G)
4999
5000
　　　SLAVE LU
　　　(INTERNAL LUN: 03, CAPACITY: 20 G)
6999

COMBINED LU

RG ADDRESS
0000
　　(RG#3)
1999
4000
　　(RG#3)
6999
2000
　　(RG#4)
3999

FIG. 16C

LU ADDRESS
0000
　　　MASTER LU
　　　(INTERNAL LUN: 01, CAPACITY: 20 G)
1999
2000
　　　SLAVE LU (CAPACITY: 10 G)
2999

RG ADDRESS
0000
1999
4000       (RG#3)
4999

| RG ADDRESS | |
|---|---|
| 0000 | MASTER LU (COMBINED LUN: 01, INTERNAL LUN: 01, CAPACITY: 20 G) |
| 1999 | |
| 4000 | SLAVE LU (COMBINED LUN: 01, INTERNAL LUN: 02, MASTER LUN: 01, CAPACITY: 10 G) |
| 4999 | |
| 6999 | FREE SPACE (FREE CAPACITY: 20 G) |

| RG ADDRESS | |
|---|---|
| 2000 | |
| 6999 | FREE SPACE (FREE CAPACITY: 50 G) |

STORAGE SYSTEM WITH LU-SETTING FUNCTION

CROSS REFERENCES TO RELATED APPLICATIONS

This application relates to and claims priority from Japanese Patent Application No. 2008-256313, filed on Oct. 1, 2008, the entire disclosure of which is incorporated herein by reference.

FIELD OF THE INVENTION

The present invention relates to setting of LUs (Logical Units) in a storage system including a plurality of physical storage devices.

DESCRIPTION OF THE RELATED ART

An exemplary setting of LUs includes capacity expansion of LUs. For capacity expansion of LUs as such, an LU being a target for capacity expansion may be combined with another, for example. An example includes JP-A-2002-236560.

For combination of LUs as such, an operator generally executes a process for creating LUs for combination in advance through operation of a console, and then makes inputs of the LUN (logical Unit Number) of an LU being a target for capacity expansion and the LUN of any LU created for combination with the target LU. For creating the LU(s), for example, the operator refers to information about any free portion of a storage space in a storage system using the console, thereby specifying any desired space portion in the free portion of the storage space. Thus specified space portion is defined as an LU.

SUMMARY OF THE INVENTION

The problem here is that such an operation is burdensome for the operator. Especially when there are two or more LUs for combination use, the above-described operation becomes more annoying. This is because there needs to input information about the two or more LUs in the LU creation process.

Such a problem possibly occurs to any other type of LU setting, i.e., other than the capacity expansion of LUs as such.

In consideration thereof, an object of the invention is to provide an LU setting technology with a reduced level of the operator's load of work.

In a storage system, an operator makes an input only of minimum-required information, and when an LU setting command including the information is accepted, in response to the LU setting command, any internal process is executed using configuration management information about an LU and a plurality of physical storage devices. After completion of the internal process, the processing result is forwarded back. Herein, the configuration management information is about the LU and the physical storage devices, including information about a free area and a free capacity in a storage space of each of the physical storage devices, and information about the LU based on the storage spaces. The free area is an address area occupied by the free space not used as the LU. The free capacity is the capacity of the free space.

BRIEF DESCRIPTION OF THE DRAWINGS

FIG. 2 shows an exemplary configuration of an RG table 131;

FIG. 3 shows an exemplary configuration of an LU table 132;

FIG. 6A shows an RG#03 before LU expansion;

FIG. 6B shows an RG#04 before LU expansion;

FIG. 7A shows the RG table 131 before LU expansion;

FIG. 7B shows an example of the LU table 132 before LU expansion;

FIG. 8A shows the RG table 131 after an LU defining process for the first time;

FIG. 8B shows the LU table 132 after the LU defining process for the first time;

FIG. 9A shows the RG table 131 after the LU defining process for the second time;

FIG. 9B shows the LU table 132 after the LU defining process for the second time;

FIG. 10A shows the LU table 132 after the LU expansion process;

FIG. 10B shows a designated LU before LU expansion;

FIG. 10C shows a combined LU after LU expansion (result of coupling the designated LU with any other LU);

FIG. 11A shows the RG#03 after LU expansion;

FIG. 11B shows the RG#04 after LU expansion;

FIG. 14A shows the RG table 131 before LU reduction;

FIG. 14B shows an example of the LU table 132 before LU reduction;

FIG. 15A shows the RG table 131 after the LU reduction process;

FIG. 15B shows the LU table 132 after the LU reduction process;

FIG. 16A shows the LU table 132 after the process flow of LU reduction;

FIG. 16B shows a combined LU before LU reduction;

FIG. 16C shows a combined LU after LU reduction;

FIG. 17A shows the RG#03 after LU reduction;

FIG. 17B shows the RG#04 after LU reduction;

DESCRIPTION OF THE PREFERRED EMBODIMENTS

In the below, by referring to the accompanying drawings, several embodiments of the invention are described. Note that, in the below, a description is given as if a computer program executes the processes as appropriate for avoiding redundancy of description, but the processes are actually executed by a processor running the computer program.

First Embodiment

Figure 1:
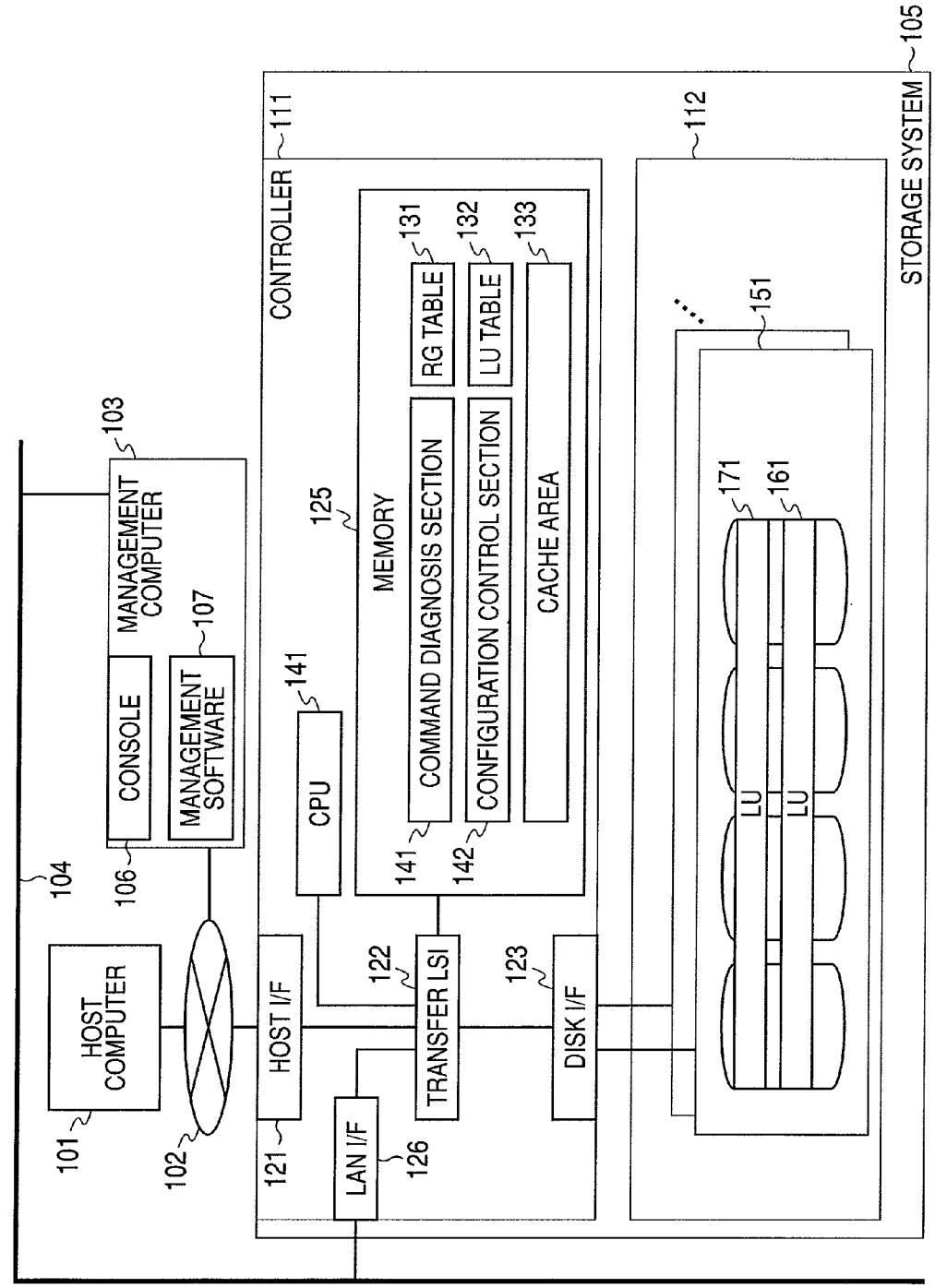
FIG. 1 shows an exemplary configuration of a computer system in a first embodiment of the invention.

FIG. 1 shows an exemplary configuration of a computer system in a first embodiment of the invention.

An SAN (Storage Area Network) 102 is connected with a host computer 101 and a storage system 105. A LAN (Local Area Network) 104 is connected with a management computer 103 and the storage system 105. As an alternative configuration, at least either the SAN 102 or the LAN 104 may be implemented by any other type of network.

The host computer 101 and the management computer 103 may be each a computer provided with information processing resources such as CPU (Central Processing Network) and a memory, and are each exemplified by a personal computer, a work station, a main frame, and others. In this embodiment, the host computer 101 is exemplified by being provided only one, but may be provided more.

The host computer 101 forwards, to the storage system 105, an I/O (Input/Output) command with which a port ID and a LUN are designated.

The management computer 103 includes a console 106, e.g., an input unit and a display unit, and management software 107 for use with LU setting to the storage system 105. The management software 107 is a computer program to be run by the CPU in the management computer 103. With the management software 107, an operator accepts any information input through the console 106, and displays information thereon. The management software 107 may be installed in the host computer 101 instead of in the management computer 103.

The storage system 105 is configured to include a controller 111, and an HDD group 112.

The HDD group 112 includes a plurality of RAID (Redundant Array of Independent (or Inexpensive) Disks) groups 151. The RAID groups (hereinafter, RGs) 151 are each configured by a plurality of HDDs 161, and store data in accordance with any predetermined RAID level. Based on a storage space of such RAID groups 151, an LU (Logical Unit) 171 is formed as a logical storage device. As an alternative to the HDDs 161, any other type of physical storage device may be used, e.g., flash memory.

The controller 111 is configured to include a host interface (I/F) 121, a memory 125, a transfer LSI (Large Scale Integration) 122, a CPU 124, a disk I/F 123, and a LAN I/F 126.

The host I/F 125 is a communications interface device with the host 101, and includes a plurality of ports, for example. The host I/F 125 is provided with an I/O command from the host computer 101. When the I/O command is a write command, the data for writing is stored in a cache area 133 of the memory 125 via the host I/F 125. On the other hand, when the I/O command is a read command, the data for reading is read from the cache area 133, and then is forwarded to the host computer 101 via the host I/F 125.

The memory 125 has the cache area 133 described above for temporarily storing the data to be exchanged between the host computer 101 and the LU 171. The memory 125 also stores a computer program to be run by the CPU 124, and a table for reference use by the CPU 124. Such a table includes an RG table 131 and an LU table 132, for example. The computer program includes a command diagnosis section 141, and a configuration control section 142, for example. The command diagnosis section 141 has a function serving as an interface with respect to the management software 107, e.g., accepts commands from the management software 107, and in response to the commands, issues commands to the configuration control section 142, for example. The configuration control section 142 executes a process responding to the commands coming from the command diagnosis section 141, and forwards back the process result to the command diagnosis section 141. Such computer program and table will be described later in detail.

A transfer LS 1103 performs control over exchanges among components in the controller 111.

The disk I/F 123 is a communications interface device with respect to the HDDs 161. When the I/O command provided via the host I/F 125 is a write command, the data for writing is read from the cache area 133, and is written into an LU designated by the command, i.e., the HDD 161 being a basis of the LU, designated by the command via the disk I/F 125. On the other hand, when the I/O command provided via the host I/F 125 is a read command, the data for reading is read from the LU designated by the command, i.e., the HDD 161 being a basis of the LU, and thus read data is written into the cache area 133.

FIG. 2 shows an exemplary configuration of the RG table 131.

The RG table 131 is recorded with information about each of the RGs 151. To be specific, the RG table 131 is recorded with, on the basis of the RG 151, RG#, HDD#, information about address area, information about free area, and information about free capacity, for example. In the below, any one of the RGs is taken as an example (hereinafter, such an RG is referred to as "target RG" in the following description given by referring to FIG. 2), and various types of information are described.

The RG# is an identification number of the target RG.

The HDD# is an identification number of the HDD(s) 161 configuring the target RG.

The address area information is about an address area of a storage space of the target RG, i.e., from a head LBA (Logical Block Address) to an end LBA.

The free area information is about an address area of every free spatial portion in the address area of the target RG. The "free spatial portion" denotes the portion of the storage space of the target RG not used as an LU.

The free capacity information is about the free capacity of the target RG. The "free capacity" denotes the total capacity of one or more free spatial portions in the target RG.

FIG. 3 shows an exemplary configuration of the LU table 132.

The LU table 132 is recorded with information about each of the LUs 171. To be specific, the LU table 132 is recorded with, on the basis of the LU 171, a port ID, an external LUN, an internal LUN, the number of configured LUs, status information, capacity information, type information, a master LUN, a start LBA, an update block information, an RG#, and RG address information, for example. In the below, any one of the LUs is taken as an example (hereinafter, such an LU is referred to as "target LU" in the following description given by referring to FIG. 3), and various types of information are described.

The port ID is an identifier of the port correlated with the target LU, i.e., port provided in the host I/F.

The external LUN is the one allocated to the target LU, and is provided to the host computer 101. The external LUN includes two types of LUNs, i.e., combined LUN and host LUN, for example. The combined LUN is an external LUN allocated to a combined LU, which is a group of a plurality of LUs. On the other hand, the host LUN is an external LUN allocated to an LU. When a combined LU is configured by a plurality of LUs, the combined LUN is used as the external LUN, and the host LUN is used as the external LUN. The LUN designated by the I/O command coming from the host computer 101 is entirely an external LUN.

The internal LUN is the one allocated to the target LU, and is not provided to the host computer 101.

The number of configured LUs is information to be set when the target LU is a part of the combined LU, indicating the number of the LUs configuring the combined LU.

The status information is about the status of the target LU. The status information includes at least one of the following 1 to 5, that is, 1. in use: status meaning that a target LU is accessible by the host computer 101,
2. not in use: status meaning that the target LU is not accessible by the host computer 101,
3. during creation: status meaning that the target LU is being created,
4. during expansion: status meaning that a combined LU including the target LU is being created, and
5. during reduction: status meaning that the combined LU including the target LU is being reduced in capacity.

The capacity information is about the storage capacity of the target LU. For information, the storage capacity of the combined LU is the sum of the storage capacities of a plurality of LUs configuring a combined LU.

The type information is about the type of the target LU. The type information includes "normal", "master", and "slave", for example. The "normal" means that the target LU is not a part of the combined LU, the "master" means that the target LU serves as a main component in the combined LU, and the "slave" means that the target LU does not serve as a main component in the combined LU. In the below, any LU with the type information of "master" is sometimes referred to as "master LU", and any LU with the type information of "slave" is sometimes referred to as "slave LU".

A master LUN denotes a LUN of a master LU in a combined LU including a target LU. When the target LU is the master LU, any value significant as the master LUN is not set.

The start LBA is a head LBA of the target LU, and can be designated by an I/O command coming from the host computer 101.

The update block information is about the address of an update block in the target LU not with the status information of "not in use". The update block is the one storing any data written from the host computer 101.

The RG# is an identification number of the RG being a basis of the target LU.

The RG address information is about an LBA in any spatial portion occupied by the target LU in the storage space of the RG being the basis of the target LU. This information is not necessarily the same as the start LBA described above. To be specific, when the target LU is a part of the combined LU acknowledged by the host computer 101, the head LBA is the address in the combined LU, but the RG address information is about the address in the storage space of the RG, for example.

The LU setting in this embodiment includes three types, i.e., LU creation, LU expansion, and LU reduction. In the below, these types of LU setting are described.

Figure 4:
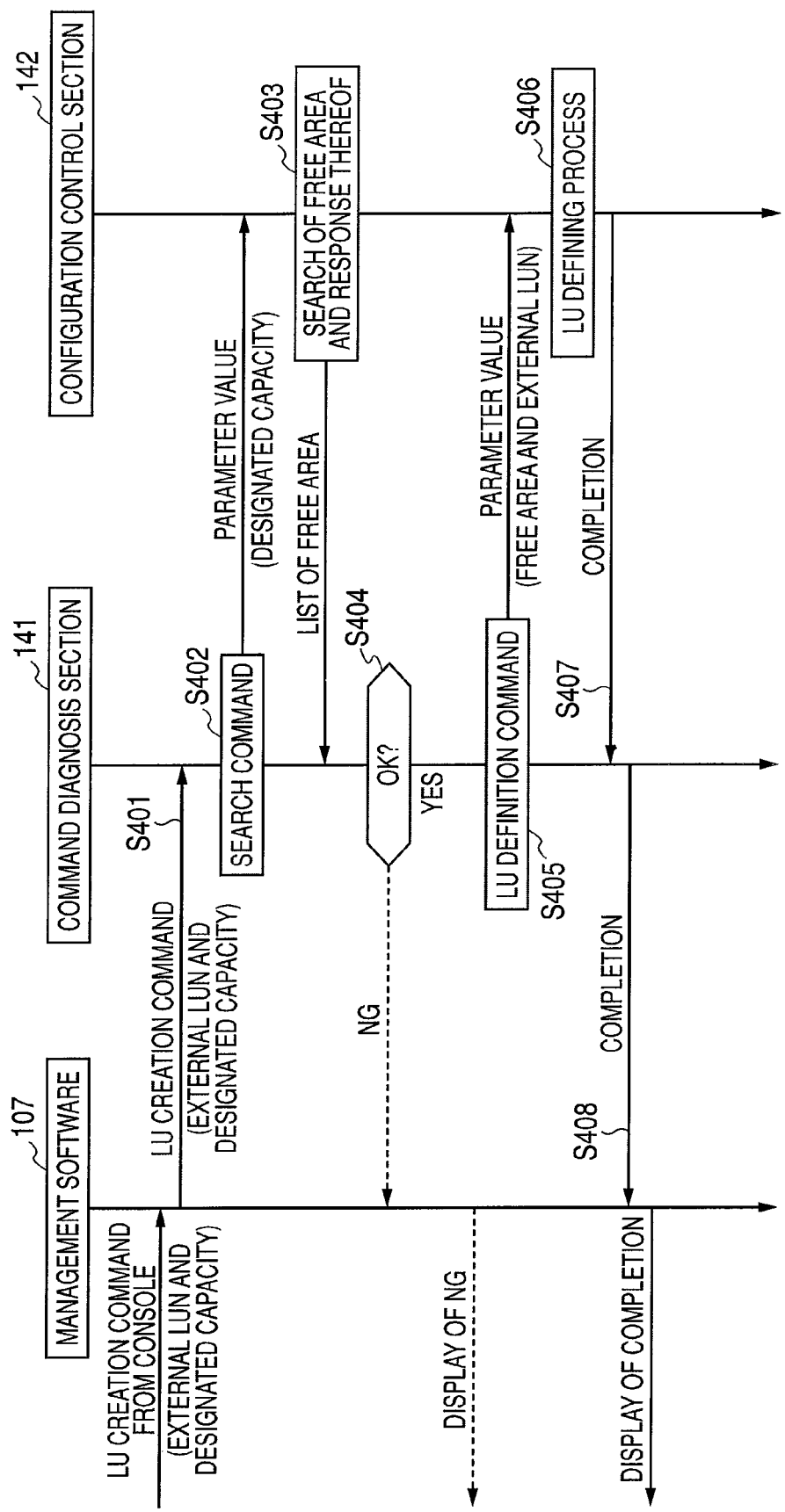
FIG. 4 shows a process flow of LU creation.

FIG. 4 shows a process flow of LU creation.

Through operation of the console 106, an operator makes inputs of an external LUN for allocation to an LU to be newly created, and information about the capacity of the LU. Hereinafter, such a capacity is referred to as "designated capacity" in the following description given referring to FIG. 4.

The management software 107 creates an LU creation command including the inputs, i.e., the external LUN and the information about the designated capacity. Thus created LU creation command is forwarded to the storage system 105 (S401). In response to the LU creation command, in the storage system 105, processes of S402 to S408 are executed as below.

In S402, the command diagnosis section 141 issues a command to the configuration control section 142 for searching for any free area. Such a search command includes a parameter value, e.g., value indicating the designated capacity.

In S403, the configuration control section 142 makes a search for the free space in response to the search command, and makes a response to the command diagnosis section 403 about the search result. With such a search for the free space, the RG table 131 is searched for a free space of the designated capacity requested by the search command, i.e., one or more free spatial portions. Information about the search result includes address information about thus found free area.

In S404, the command diagnosis section 141 refers to the search result information, and determines whether or not there is a free space of the designated capacity. When the determination result in S404 is negative (S404: NO), the command diagnosis section 141 forwards an NG back to the management software 107. The management software 107 displays information about the NG on the console 106.

When the determination result in S404 is positive (S404: YES), in S405, the command diagnosis section 141 forwards an LU definition command to the configuration control section 142. The LU definition command includes a parameter value, i.e., information about the designated free area (address information about the free area found in the search result information), and the external LUN provided by the console 106.

In S406, the configuration control section 142 goes through the LU defining process in response to the LU definition command. In the LU defining process, the configuration control section 142 defines the designated free area as a new LU. Thus newly defined LU is allocated with an external LUN provided by the operator. This process will be described in more detail with a description given later for an LU expansion process by referring to FIGS. 5 to 11B.

In S407, the configuration control section 142 notifies completion of the LU defining process to the command diagnosis section 141.

In S408, the command diagnosis section 141 notifies, to the management software 107, completion of the process responsively executed to the LU creation command. The management software 107 then displays, on the console 106, information indicating the completion of the process.

With such a process flow of LU creation, as long as making inputs of the external LUN and the designated capacity, the operator has no need to select any free area to create a new LU of the designated capacity with the external LUN allocated thereto.

Figure 5:
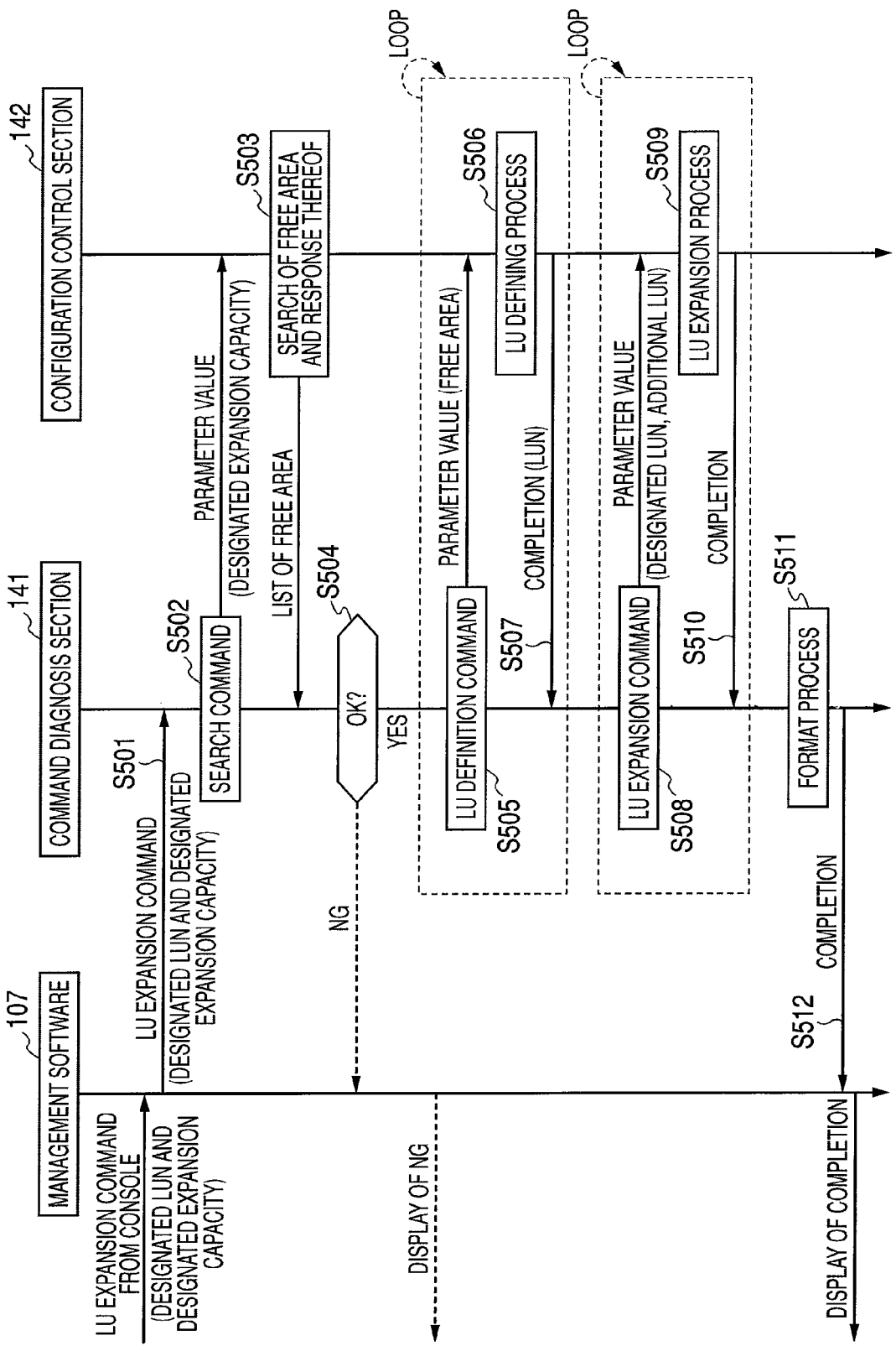
FIG. 5 shows a process flow of LU expansion.

FIG. 5 shows a process flow of LU expansion.

Through operation of the console 106, an operator makes inputs of a LUN allocated to any of the LUs being a target for capacity expansion, i.e., LU expected to serve as a master LU, and information about the capacity of the LU after capacity expansion. In the following description given by referring to FIGS. 5 to 11B, thus input LUN is referred to as "designated LUN", and the capacity indicated by the input information is as "designated expansion capacity". The designated LUN may be an external or internal LUN. The designated expansion capacity may be the storage capacity after capacity expansion, i.e., storage capacity of the combined LU after completion of this process flow, or may be of a value to be added to the capacity of the expansion-target LU, i.e., capacity before capacity expansion. In this embodiment, the designated expansion capacity is assumed as being of a value to be added.

The management software 107 creates an LU expansion command including the designated LUN and the information about the designated expansion capacity. The resulting LU expansion command is forwarded to the storage system 105 (S501). In response to the LU expansion command, in the storage system 105, the following processes of S502 to S512 are executed.

In S502, the command diagnosis section 141 issues a command to the configuration control section 142 for searching for any free area. This search command includes a parameter value, e.g., value indicating the designated expansion capacity.

In S503, the configuration control section 142 makes a search for any free area in response to the search command, and makes a response to the command diagnosis section 141 about the search result. For such a search of any free area, the RG table 131 is searched to find any free area of the designated expansion capacity designated by the search command. The free area is configured by one or more free spatial portions. Hereinafter, such a free spatial portion is referred to as "target free portion" in the following description given by referring to FIGS. 5 to 11B). Information about the search result includes address information about thus found free area. When the free area is configured by a plurality of target free portions, the search result information includes address information about each of the target free portions.

In S504, the command diagnosis section 141 refers to the search result information, and determines whether there is any free area of the designated expansion capacity or not. When the determination result in S504 is negative (S504: NO), the command diagnosis section 141 forwards an NG back to the management software 107. The management software 107 displays information about the NG on the console 106.

When the diagnostic result in S504 is positive (S504:YES), in S505, the command diagnosis section 141 forwards the LU definition command to the configuration control section 142. The LU definition command includes a parameter value, i.e., information about the designated free spatial portion (address information about the free spatial portion found in the search result information).

In S506, the configuration control section 142 goes through the LU defining process in response to the LU definition command. In the LU defining process, the configuration control section 142 defines the designated free spatial portion as a new slave LU. This process will be described in more detail later by referring to FIGS. 6A to 11B.

In S507, the configuration control section 142 notifies completion of the LU defining process to the command diagnosis section 141. At the time of notification of completion as such, the LUN allocated as a result of the LU defining process in S506, i.e., internal LUN allocated to the defined LU, is passed to the command diagnosis section 141. The command diagnosis section 141 accumulates the LUN provided as such in the memory 125.

Such processes of S505 to S507 are repeated until every target free portion is through therewith. After every target free portion is through with the processes of S505 to S507, i.e., after every target free portion is defined as an LU, the procedure goes to S508.

In S508, the command diagnosis section 141 forwards the LU expansion command to the configuration control section 142. The LU expansion command includes a parameter value, i.e., the designated LUN, and any one of the not-yet-processed LUNs accumulated in the memory 125. Hereinafter, such a LUN is referred to as "additional LUN" in the following description given by referring to FIGS. 5 to 11B).

In S509, in response to the LU expansion command, the configuration control section 142 goes through the LU expansion process. In the LU expansion process, the configuration control section 142 executes the process of combining an LU corresponding to the additional LUN to a master LU corresponding to the designated LUN. This process will be described in more detail later by referring to FIGS. 6A to 11B.

In S510, the configuration control section 142 notifies the completion of the LU expansion process to the command diagnosis section 141.

Such processes of S508 to S510 are repeated until every target LU to be combined to the master LU is through therewith.

After every target LU is through with the processes S508 to S510, i.e., after every target LU is combined to the master LU corresponding to the designated LUN, in S511, the command diagnosis section 141 executes the format process. In the format process, every slave LU is formatted.

After completion of such a format process, in S512, the command diagnosis section 141 notifies, to the management software 107, the completion of the process executed in response to the LU expansion command. The management software 107 displays information about the completion of the process on the console 106.

With such a process flow of LU expansion, as long as making inputs of the designated LUN and the designated expansion capacity, the operator has no need to go through any specific process in advance, e.g., creating a slave LU(s) and selecting any of a plurality of LUs for use as a slave LU(s), to create a new LU of the capacity extended by the designated expansion capacity, i.e., combined LU.

Described in detail below are the LU defining process and the LU expansion process in the process flow of LU expansion. Note that, in the below, a RAID group with an RG number of n is denoted as "RG#n" (where n is any of the numbers 00, 01, . . . , and others).

Before the LU defining process is started, as shown in FIG. 6A, for example, the LU corresponding to the designated LUN, i.e., designated LU, is defined as being "RG#03". The "RG#03" has a free space 601 of 30 G (gigabytes), i.e., free area of 4000 to 6999. Moreover, as shown in FIG. 6B, the "RG#04" has a free space 603 of 50 G, i.e., free space of 2000 to 6999. Therefore, before the LU defining process is started, the RG table 131 looks as shown in FIG. 7A, and the LU table 132 looks as shown in FIG. 7B.

In this example, the designated expansion capacity, i.e., capacity to be added to the master LU with the capacity of 20 G is assumed as being 50 G.

Once the LU defining process is started, as shown in FIG. 8B, the status information about a record 1321 (record in the LU table 132) corresponding to the master LU (internal LUN: 01) is updated to indicate "during expansion".

In this embodiment, in the LU defining process, a search is made, with a high priority, for any free space with an address with a smaller value. As such, in this example, first of all, based on the free area information of the RG table 131 of FIG. 7A, a successive free space 601 of RG#03 is found (refer to FIG. 6A). As shown in FIG. 8B, a new record 132 with an LU being the free space 601 is additionally provided. The record 132 is recorded with a plurality of information components bolded and underlined in FIG. 8B. Among such a plurality of information components, the port ID and the status information are set to be the same as the port ID (port ID: 00) and the status information ("during expansion") corresponding to the master LU. The host LUN and the internal LUN are set by a predetermined rule, i.e., the internal LUN is set to a value not being the same as that of any existing LU. For use as the capacity information, set is information representing the capacity 30 G of the free space 601. For use as the RG area information, set is information indicating an RG address area of 4000 to 6999 of the free space 601. With such processes, as bolded and underlined in FIG. 8A, in a record 1311 corresponding to the RG#03 in the RG table 131, the free area information is updated to indicate a NULL value, and the free capacity information of 30 G is updated to indicate 0 G. That is, from the total free capacity of a plurality of RGs, the capacity of 30 G is reduced from the capacity of the free space 601.

With such an LU defining process, the free space 601 in the RG#03 is handled as a single LU. As a result of such a process, the internal LUN: 02 of the LU is forwarded from the configuration control section 142 back to the command diagnosis section 141, and the command diagnosis section 141 accumulates the internal LUN: 02 in the memory 125.

As such, the defined capacity of the LU is now 30 G, which is not enough for the designated expansion capacity of 50 G. As such, to the shortages of the capacity, i.e., 20 G, the LU defining process is executed again.

In the LU defining process repeatedly executed as such, based on the free area information of the RG table 131 of FIG. 7A, a successive free space 603 of RG#04 is found (refer to FIG. 6A). However, the free space 603 (address area of 2000 to 6999) has the capacity of 50 G, which is exceeding the capacity of 20 G. As such, in a portion of the free space 603, a 20 G-capacity free portion, 605 is specified, i.e., free area of 2000 to 3999. As shown in FIG. 9B, a new record 133 with an LU being a free space 605 is additionally provided. The record 133 is provided with a plurality of information components bolded and underlined as shown in FIG. 9B. Among such a plurality of information components, the port ID and the status information are set to be the same as the port ID (port ID: 00) and the status information ("during expansion") corresponding to the master LU. The host LUN and the internal LUN are set by a predetermined rule. For use as the capacity information, set is information representing the capacity of 20 G of the free space 605. For use as the RG area information, set is information indicating an RG address area of 2000 to 3999 of the free space 605. With such processes, as bolded and underlined in FIG. 9A, in a record 1312 corresponding to the RG#04 in the RG table 131, the free area information of 2000 to 6999 is updated to indicate 4000 to 6999, and the free capacity information of the capacity 50 G is updated to indicate 30 G. That is, from the total free capacity of a plurality of RGs, the capacity of 20 G is reduced from the capacity of the free portion 605.

As such, because an LU is defined in the free area of the designated expansion capacity of 50 G, this is the end of the procedure of the loop from S505 to S507 of FIG. 5, and the procedure starts the loop from S508 to S510. That is, for the two LUs defined by the LU defining process executed twice, i.e., the records 1322 and 1323 in the LU table 132, the LU expansion process is now executed.

First of all, from the command diagnosis section 141, the configuration control section 142 is provided with the designated LUN: 01, and the additional LUN: 02 (internal LUN of the LU defined in the free space 601 (refer to FIG. 6A)). The configuration control section 142 then updates the records in the LU table 132, i.e., the record 1311 corresponding to the designated LUN, and the record 1322 corresponding to the additional LUN: 02. To be specific, as shown in FIG. 10A, in the record 1311, a host LUN corresponding to the designated LUN is set as a combined LUN, and the type information is set with "master", i.e., the LU corresponding to the designated LUN is defined as being a master LU. Moreover, in the record 1322, a host LUN corresponding to the designated LUN is set as a combined LUN, and the type information is set with "slave". Also in the record 1322, the internal LUN: 01 corresponding to the designated LUN is set as a master LUN, and an address 2000 subsequent to the end LU address 1999 of the designated LU (master LU) is set as a start LBA. That is, the LU corresponding to the additional LUN: 02 is combined to the master LU. Note here that the LU address can be designated by the host computer 101, and is different from the RG address.

Next, from the command diagnosis section 141, the configuration control section 142 is provided with the designated LUN: 01, and the additional LUN: 03 (internal LUN of the LU defined in the free space 605 (refer to FIG. 6B)). The configuration control section 142 then updates the records in the LU table 132, i.e., the record 1322 corresponding to the additional LUN: 03. To be specific, as shown in FIG. 10A, in the record 1323, a host LUN corresponding to the designated LUN is set as a combined LUN, and the type information is set with "slave". Also in the record 1323, the internal LUN: 01 corresponding to the designated LUN is set as a master LUN, and an address 5000 subsequent to the end LU address 4999 of the immediately-preceding slave LU (LU corresponding to the internal LUN: 02) is set as a start LBA. That is, the LU corresponding to the additional LUN: 02 is combined to the master LU. Note here that the LU is combined after the slave LU (LU corresponding to the internal LUN: 02) is combined to the master LU.

As a result of such a series of processes, the designated LU of FIG. 10B is coupled with the two LUs, thereby deriving a combined LU of FIG. 10C. The LU address will be configured by the successive addresses, and the combined LU is acknowledged as a single piece of LU by the host computer 101. Note here that, as a result of such a series of processes, the free area in the RG#03 looks as shown in FIG. 11A, and the free area in the RG#04 looks as shown in FIG. 11B.

Figure 12:
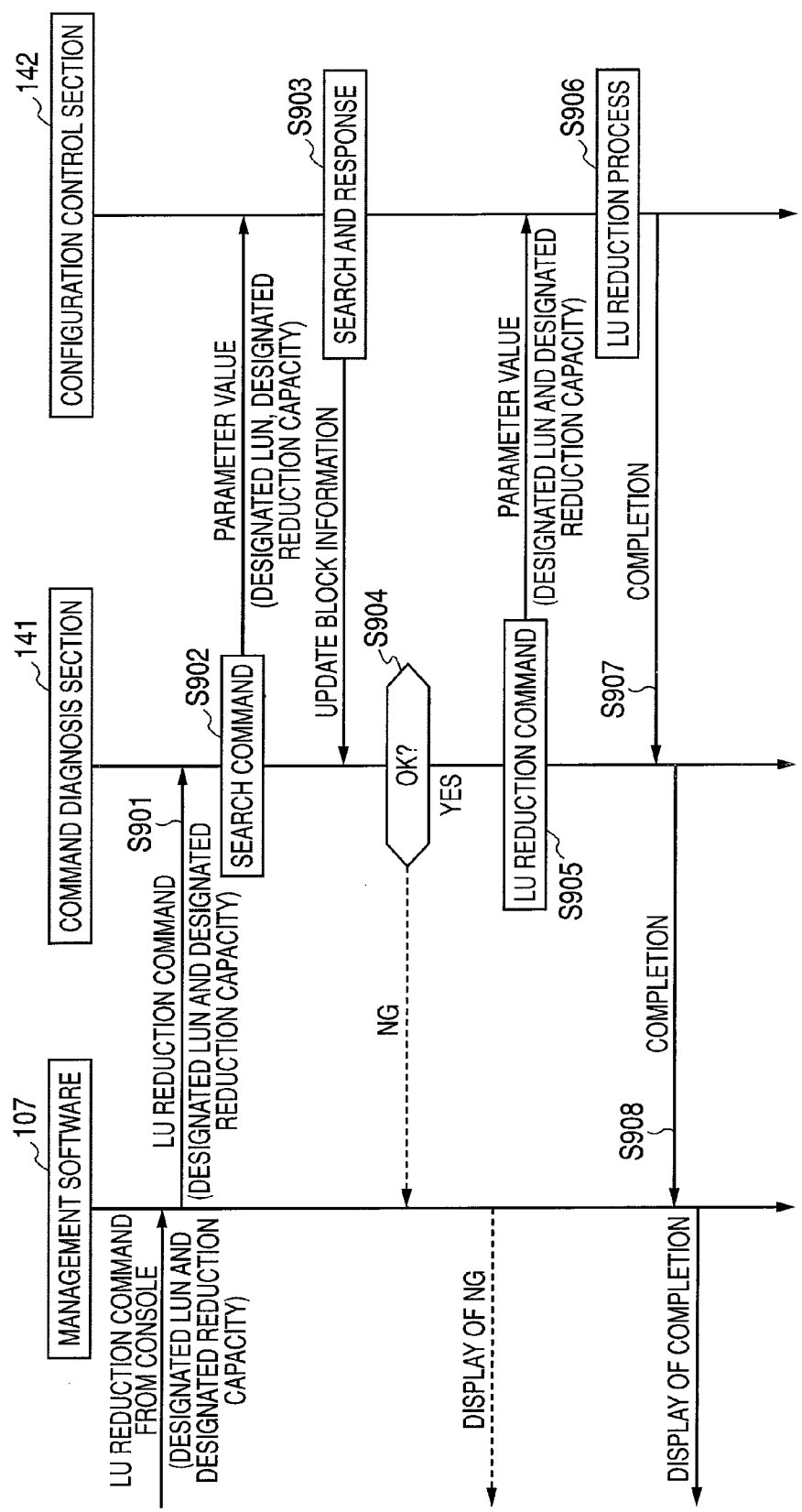
FIG. 12 shows a process flow of LU reduction.

By referring to FIG. 12, described next is a process flow of LU reduction.

Through operation of the console 106, an operator makes inputs of a LUN allocated to an LU being a target for capacity reduction (typically, a combined LU), and information about the capacity of the LU after the capacity reduction. In the following description given by referring to FIGS. 12 to 17B, the LUN input as such is referred to as "designated LUN", and the capacity indicated by the information input as such is referred to as "designated reduction capacity". The designated LUN may be a combined LUN, or an external or internal LUN corresponding to the master LU in the combined LU. The designated reduction capacity may be the storage capacity after the capacity reduction, i.e., storage capacity of the reduction-target LU after completion of this process flow, or may be the capacity as a subtraction result from the reduction-target LU, i.e., capacity before the capacity reduction. In this embodiment, the designated reduction capacity is assumed as being the capacity to be reduced.

The management software 107 creates an LU reduction command including the inputs, i.e., the designated LUN and the information about the designated reduction capacity. Thus created LU reduction command is forwarded to the storage system 105 (S901). In response to the LU reduction command, in the storage system 105, processes of S902 to S908 are executed as below.

In S902, the command diagnosis section 141 issues a command to the configuration control section 142 for searching for any area for capacity reduction. Such a search command includes a parameter value, e.g., the designated LUN and the designated reduction capacity.

In S903, in response to the search command, the configuration control section 142 makes a search for any update block in the reduction area of the designated reduction capacity, and makes a response to the command diagnosis section 403 about the search result.

In S904, the command diagnosis section 141 refers to the search result information, and determines whether or not there is an update block in the reduction area. When the determination result in S904 is negative (S904: NO), the command diagnosis section 141 forwards an NG back to the management software 107. The management software 107 displays information about the NG on the console 106.

When the determination result in S904 is positive (S904: YES), in S905, the command diagnosis section 141 forwards an LU reduction command to the configuration control section 142. The LU reduction command includes a parameter value, i.e., the designated LUN, and the designated reduction capacity.

In S906, the configuration control section 142 goes through the LU reduction process in response to the LU reduction command. In the LU reduction process, the configuration control section 142 goes through a process of deallocating the area of the designated reduction capacity from the reduction-target LU corresponding to the designated LUN. This process will be described in more detail later by referring to FIGS. 13A to 17B.

In S907, the configuration control section 142 notifies completion of the LU reduction process to the command diagnosis section 141.

In S908, the command diagnosis section 141 notifies, to the management software 107, the completion of the process executed in response to the LU reduction command. The management software 107 displays, on the console 106, information indicating the completion of the process.

With such a process flow of LU reduction, as long as making inputs of the designated LUN and the designated reduction capacity, the operator has no need to go through any specific process, e.g., selecting a LU(s) for deallocation from the reduction-target LU, to create a new LU of the capacity from which the designated expansion capacity is reduced, i.e., a combined LU or a single piece of LU.

In the below, described in detail is the LU reduction process in the process flow of LU reduction. In the below, the reduction-target LU is assumed as being a combined LU, which is a combination of a master LU and two slave LUs, and the designated reduction capacity is assumed as being 40 G.

Figure 13A:
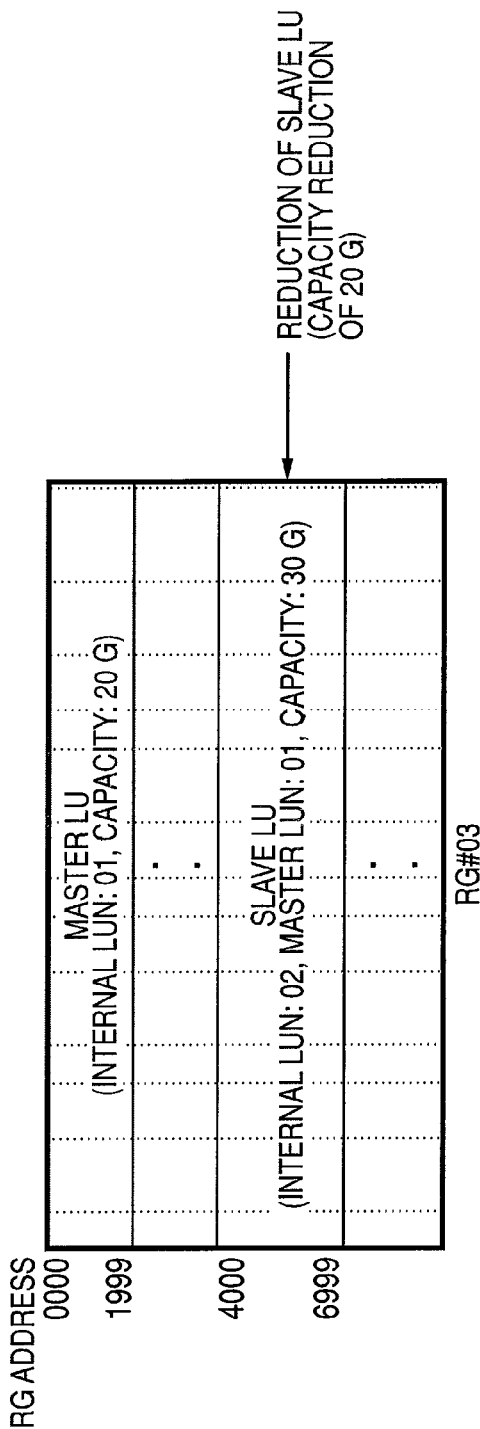
FIG. 13A shows the RG#03 before LU reduction.
Figure 13B:
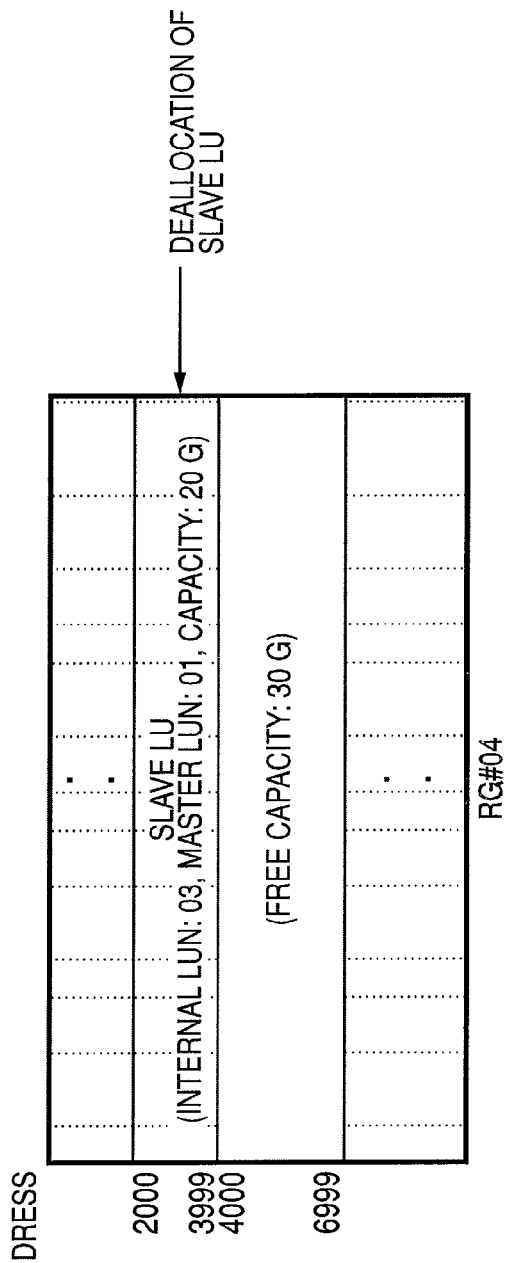
FIG. 13B shows the RG#04 before LU reduction.

Before the LU reduction process is started, for example, the RG#03 is used as a basis to create the master LU and one of the two slave LUs in the combined LU being a target for capacity reduction (refer to FIG. 13A), and the RG#04 is used as a basis to create the remaining slave LU (refer to FIG. 13B). Before the LU reduction process is started, the RG table 131 looks as shown in FIG. 14A, and the LU table 132 looks as shown in FIG. 14B.

Because the combined LU being a target for capacity reduction looks as shown in FIG. 16B, for example, for reduction of the capacity of 40 G being the designated reduction capacity, there needs to deallocate the slave LU with the capacity of 20 G including the end address of the combined LU, i.e., second slave LU, from the combined LU, and to reduce the capacity of 20 G from the first slave LU with the capacity of 30 G (refer to FIGS. 13A and 13B). Assuming here is that the second slave LU has no update block, and there is no update block either in the area of the capacity of 20 G from the rear end of the first slave LU. As such, the determination result of S904 of FIG. 12 is assumed as being positive.

Therefore, once the LU reduction process is started, as shown in FIG. 15B, the status information is updated to "during reduction" for the master LU and the first slave LU. Moreover, the record corresponding to the first and second slave LUs are removed from the LU table 132. In accordance therewith, the number of the LUs configuring the master LU is updated from "3" to "2", and the number of the LUs configuring the first slave LU is also updated from "3" to "2". As shown in FIG. 15A, in the record corresponding to RG#04, the free capacity information indicating the capacity of 30 G is updated to indicate the capacity of 50 G, which is a result of being added with the capacity of 20 G of the second slave LU deallocated from the combined LU. The information about the free area of 4000 to 6999 is updated to indicate 2000 to 6999, which is a result of being added with the RG address 2000-3999 that has been occupied by the second LU.

Moreover, as shown in FIG. 15B, in the record 1322 corresponding to the first slave LU, the capacity information of 30 G is updated to indicate 10 G, and the RG area information of 4000 to 6999 is updated to indicate the address area of 4000-4999, which is a result of reduction of the capacity of 20 G from the rear end of the first slave LU. As a result thereof, as shown in FIG. 15A, in the record corresponding to the RG#03, the free capacity information of 0 G is updated to indicate 20 G, which is a result of adding the capacity of 20 G that has been reduced from the first LU. The information about the free area of a value of NULL is updated to indicate an address 5000 to 6999 corresponding to the reduced area in the RG address 4000 to 6999 that has been occupied by the first LU.

After such an LU reduction process, with completion of the process flow of LU reduction, for example, in the LU table 132, as shown in FIG. 16A, the status information is updated to "in use" for the master LU and the first slave LU. Herein, although not shown, with completion of the process flow of LU expansion, the status information of the three LUs configuring the combined LU is updated from "during expansion" to "in use". When completion of the process flow thereof, the combined LU being a target for capacity reduction (refer to FIG. 16B) is reduced down to the combined LU of FIG. 16C. That is, reduced is the capacity of 40 G being the designated reduction capacity. Note here that, as a result of the process flow as such, the free area of the RG#03 looks as shown in FIG. 17A, and the free area of the RG#04 looks as shown in FIG. 17B.

This is the end of the description about the first embodiment.

Note that, when an NG is issued in at least one of the process flows of LU creation, LU expansion, and LU reduction, the reason of NG, i.e., how much capacity is excessive compared with the designated capacity, may be indicated. For example, the command diagnosis section 141 may calculate the excess of capacity based on a response from the configuration control section 142, and may forward information about the calculation result to the management software 107.

Moreover, LU reduction may be performed on an LU basis. In the above example, because the second LU is deallocated from the combined LU, the first LU may be deallocated. As such, when the designated reduction capacity is not the same as the LU-basis capacity, i.e., total amount of one or more slave LUs, the command diagnosis section 141 may forward inquiry information to the management software 107. The inquiry information is for making an inquiry which slave LU is to be deallocated, i.e., a slave LU with the capacity as close a value as possible to and smaller than the designated reduction capacity, or a slave LU with the capacity as close a value as possible to and beyond the designated reduction capacity.

Second Embodiment

In the below, a second embodiment of the invention is described. Any difference from the first embodiment is mainly described, and any respects same as those in the first embodiment are not described twice or simply described again. This is applicable also to a third embodiment and thereafter.

In the second embodiment, before accepting an input of a designated expansion capacity from an operator, the controller 111 computes the total free capacity being the sum of the free capacity of each of the RGs, calculates thus computed total free capacity, displays the total free capacity to the operator, and accepts, from the operator, an input of the designated expansion capacity equal to or smaller than the total free capacity. This accordingly prevents NG for LU expansion due to the shortage of the free capacity after the operator issues a command for LU expansion.

Figure 18:
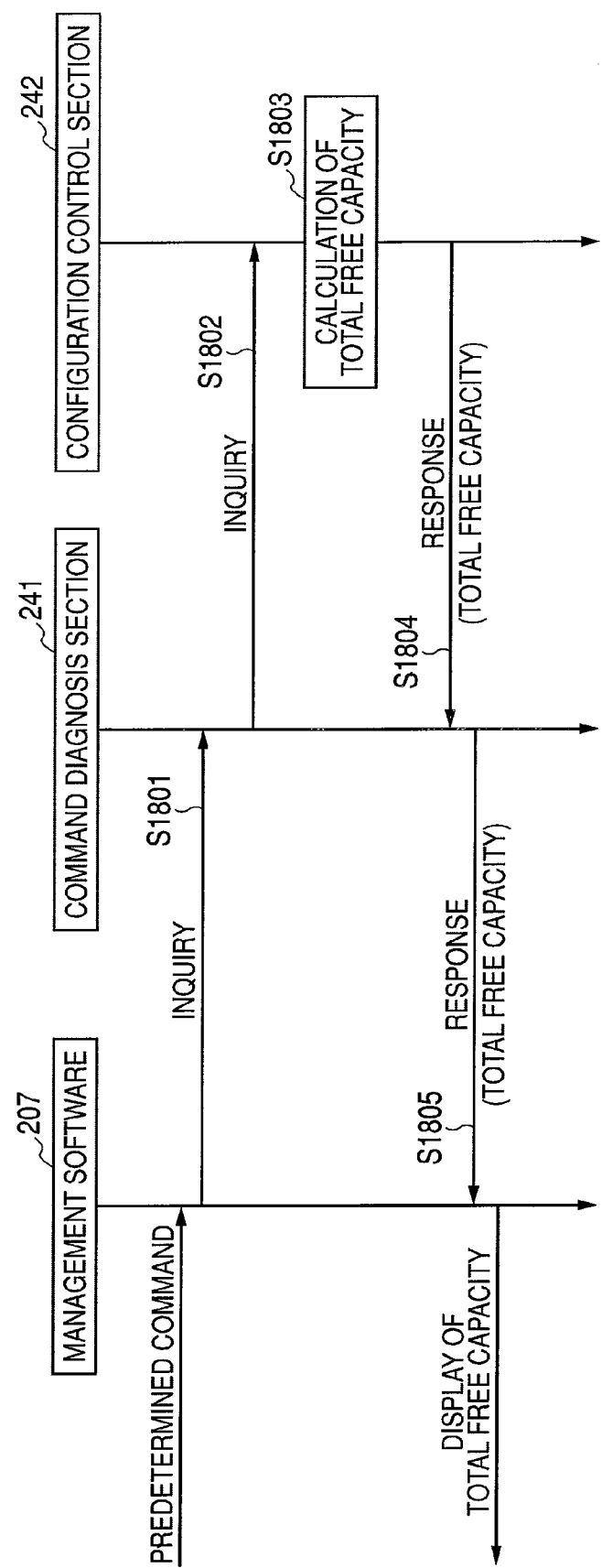
FIG. 18 shows a process to be executed in a second embodiment of the invention.

To be specific, as shown in FIG. 18, for example, in S1801, when management software 207 is provided with a predetermined command from the operator, an inquiry is made to the storage system 105 about the total free capacity.

In S1802, in response to the inquiry, a command diagnosis section 241 makes an inquiry to a configuration control section 242 about the total free capacity.

In S1803, in response to the inquiry, the configuration control section 242 refers to the RG table 131, and sums the entire free capacity, thereby calculating the total free capacity.

In S1804, the configuration control section 242 makes a response to the command diagnosis section 241 about information about the calculated total calculated free capacity.

In S1805, the command diagnosis section 241 forwards the information about the calculated total free capacity to the management software 207. The management software then displays the total free capacity in the information on the console 106, and accepts any input of the designated expansion capacity being equal to or smaller than the total free capacity.

In this embodiment, as in the first embodiment, after the operator issues a command for LU expansion, the LU expansion may be determined as NG due to the shortage of the free capacity. When the less amount of work is preferred, the operator may input the designated expansion capacity without checking the total free capacity. On the other hand, when no retry is preferred even if with much amount of work, the operator may input the designated expansion capacity after checking the total free capacity.

Third Embodiment

In the below, a third embodiment of the invention is described.

Figure 19A:
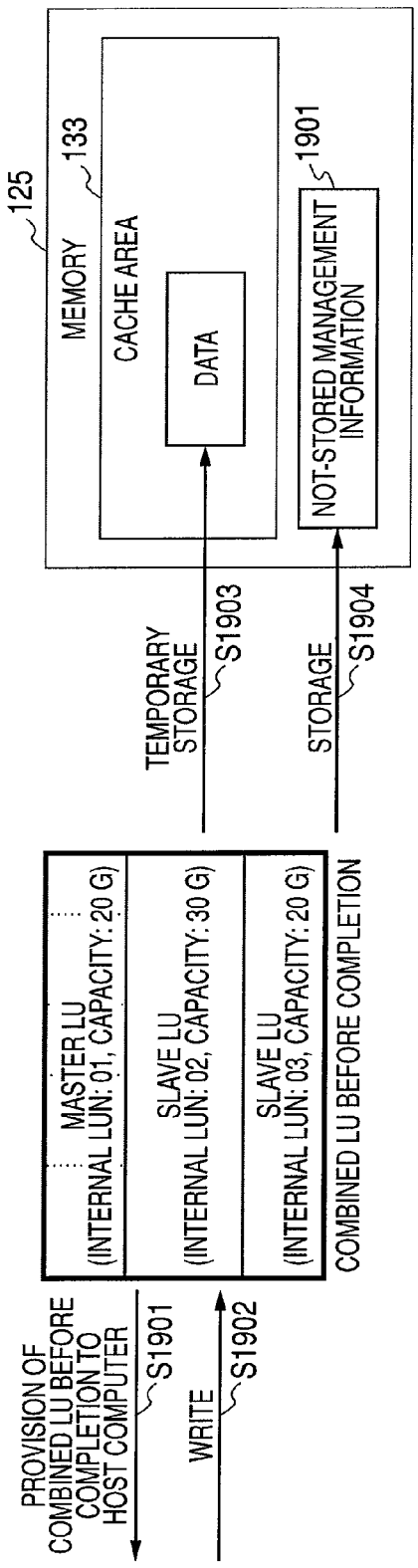
FIG. 19A shows a process to be executed before completion of a combined LU in a third embodiment of the invention.

In the third embodiment, as shown in FIG. 19A, before the LU defining process is started, the controller in the storage system makes the host computer 101 to acknowledge an LU after capacity expansion, i.e., combined LU (refer to FIG. 10C as an example) (S1901).

As such, a write command designating an address exceeding the designated LU, i.e., master LU, may come from the host computer 101 (S1902).

Figure 19B:
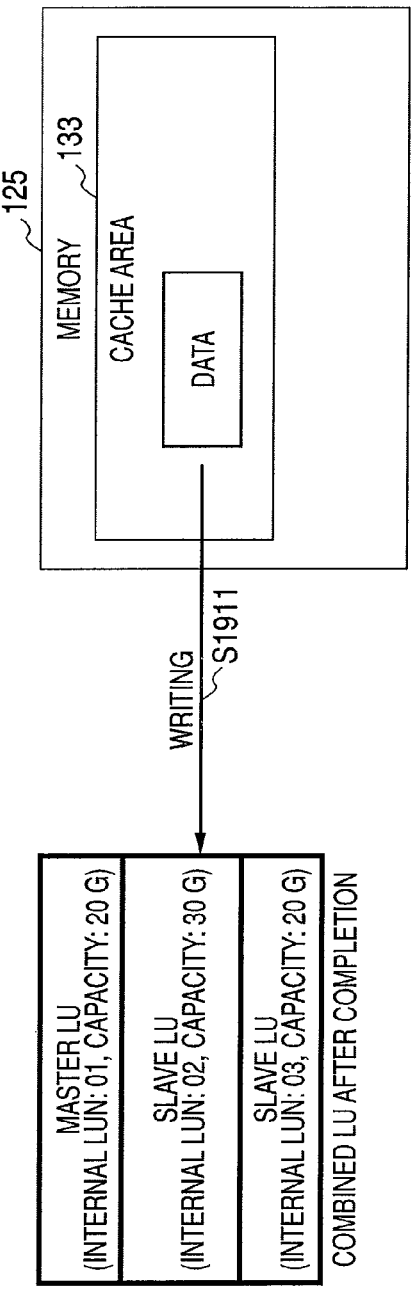
FIG. 19B shows a process to be executed after the completion of the combined LU in the third embodiment of the invention.

If this is the case, the controller stores data being a write target in accordance with the write command to the cache area 133 (S1903), and manages not-stored management information 1901 in the memory 125 (S1904). The not-stored management information 1901 indicates a correlation among the storage position of the data, the address designated by the write command, and the date and time when the write command is accepted. After completion of the combined LU, as shown in FIG. 19B, based on the not-stored management information, the controller writes the data stored in the cache area 133 to the block corresponding to the designated address in the combined LU. Such data writing is performed in the order of date and time when the write command is accepted.

Fourth Embodiment

In the below, a fourth embodiment of the invention is described.

In the fourth embodiment, as to a free space of the designated expansion capacity, for the purpose of reducing the number of LUs to be defined as much as possible, any free space equal to or smaller than the designated expansion capacity but with a capacity as large a value as possible is selected with a high priority. To be specific, in the first embodiment, because a selection of the free space is performed in the ascending order of a value of address, even if the designated expansion capacity is 50 G, the free space 601 with the capacity of 30 G in the RG#03 is selected first. On the other hand, in this embodiment, the free space 605 in the designated RG#04, i.e., the free space 605 with the free capacity same as the designated expansion capacity of 50 G, is selected first. As such, the number of the LUs to be coupled to the designated LU can be down to one. Accordingly, the number of records configuring the LU table 132 can be favorably reduced, thereby preventing the size increase of the LU table 132.

Fifth Embodiment

In the below, a fifth embodiment of the invention is described.

In the fifth embodiment, the format process after the LU expansion process is skipped.

Figure 20:
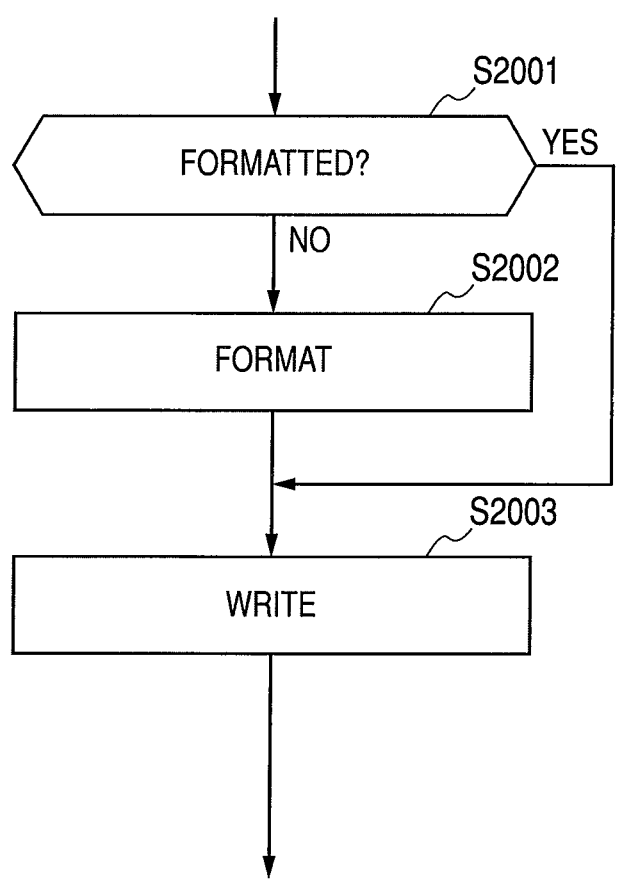
FIG. 20 shows a process to be executed in a fifth embodiment of the invention.

When the host computer 101 acknowledges a combined LU (combined LUN), and when the controller is provided with a write command designating the combined LUN from the host computer 101, as shown in FIG. 20, based on format management information, a determination is made whether the block corresponding to the address designated by the write command, i.e., write-destination block, is formatted or not (S2001). The format management information is about where the formatted block is located.

When the determination result of S2001 is negative (S2001: NO), the controller formats the write-destination block, and updates the format management information to indicate that the write-destination block is now formatted (2002). The controller then writes data for writing to the write-destination block (S2003).

Sixth Embodiment

In the below, a sixth embodiment of the invention is described.

In the sixth embodiment, the controller calculates in advance the reduceable capacity, i.e., the maximum area not including an update block from the end address of the reduction-target LU, and displays the calculation result to an operator. The controller thus accepts a command for capacity reduction in the area.

Figure 21:
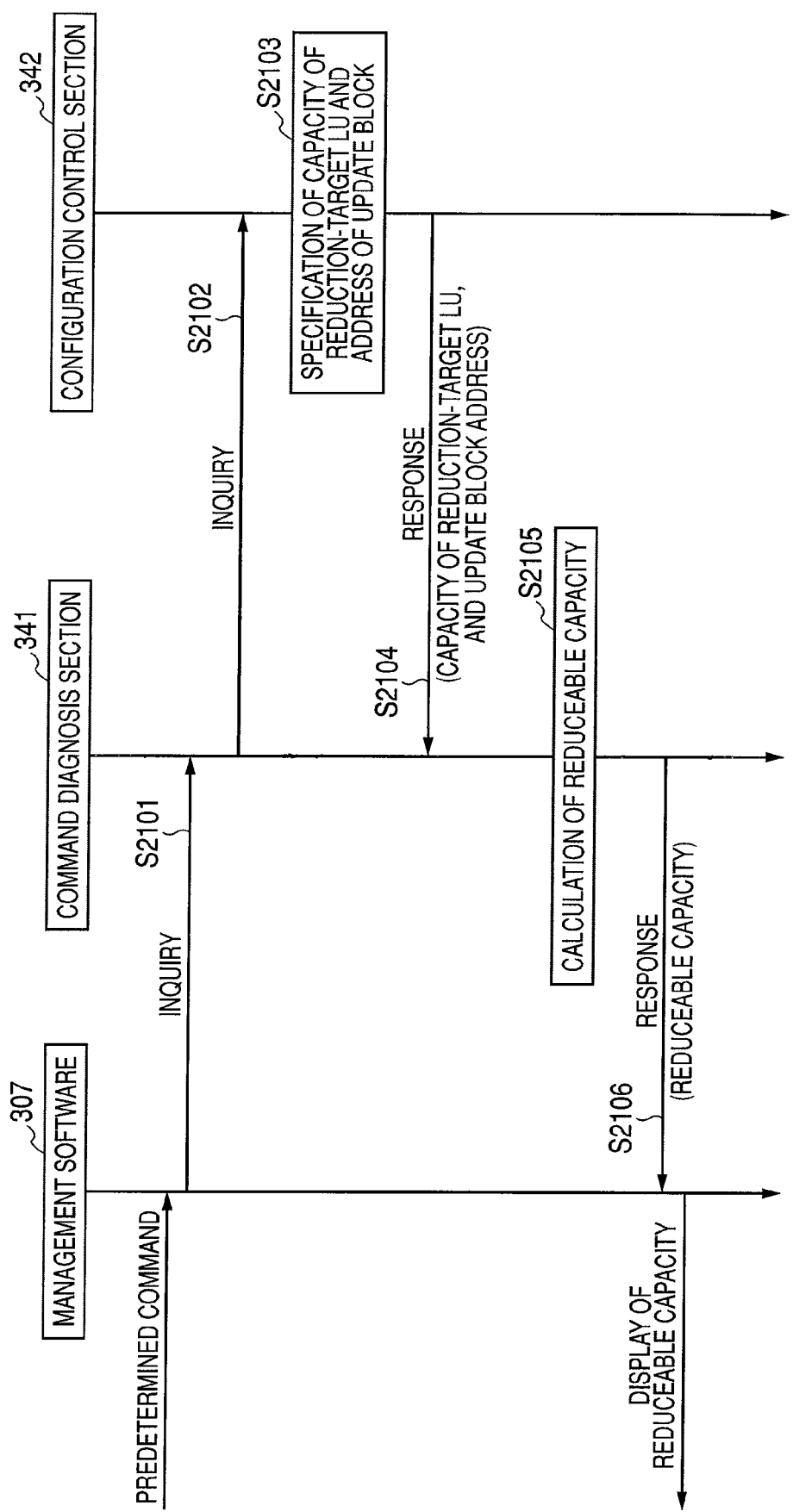
FIG. 21 shows a process to be executed in a sixth embodiment of the invention.

To be specific, as shown in FIG. 21, for example, in S2101, when management software 307 receives a predetermined command from the operator, an inquiry is made to the storage system about the reduceable capacity.

In S2102, in response to the inquiry, a command diagnosis section 341 makes an inquiry to a configuration control section 342 about the address of the update block for the reduction-target LU.

In S2103, in response to the inquiry, the configuration control section 342 refers to the LU table 132, and specifies the capacity of the reduction-target LU and the address of the update block in the reduction-target LU.

In S2104, the configuration control section 342 makes a response to the command diagnosis section 341 about the capacity and the address specified as such.

In S2105, based on the response from the configuration control section 342, the command diagnosis section 341 calculates the reduceable capacity, i.e., the maximum area not including an update block from the end address of the reduction-target LU.

In S2106, the command diagnosis section 341 forwards information about the calculation result, i.e., reduceable capacity, to the management software 207. The management software then displays the reduceable capacity in the information on the console 106, and accepts an input of the designated reduction capacity equal to or smaller than the value.

In this embodiment, as in the first embodiment, after the operator issues a command for LU reduction, the LU reduction may result in NG. When the less amount of work is preferred, the operator may input the designated reduction capacity without checking the reduceable capacity. On the other hand, when no retry is preferred even if with much amount of work, the operator may input the designated reduction capacity after checking the reduceable capacity.

While the several preferred embodiments of the invention have been described in detail, the foregoing description is in all aspects illustrative and not restrictive. It is understood that numerous other modifications and variations can be devised without departing from the scope of the invention. For example, two or more embodiments of the above-described several embodiments can be combined together.

What is claimed is:

1. A storage system that accepts an I/O command from a computer, comprising:
   a plurality of physical storage devices; and
   a controller managing a plurality of internal logical units on the plurality of physical storage devices and providing a plurality of external logical units to the computer, each external logical unit corresponding to at least one of the plurality of internal logical units,
   wherein the controller includes a memory storing a configuration management information which represents a free area and a free capacity in a storage space of each of the plurality of physical storage devices the free area is an address area occupied by a free space not used as the internal logical units, the free capacity is a capacity of the free space,
   wherein the controller accepts, from a management interface section that accepts information input by an operator using a console and displays information on the console, a logical unit expansion command including information designating a first external logical unit corresponding to a first internal logical unit and a first capacity input by the operator,
   wherein the controller specifies, in response to the logical unit expansion command, a first portion of the free space and a second portion of the free space in the free space in the plurality of physical storage devices based on the configuration management information,
   wherein the controller executes an internal logical unit creation process in which the specified first portion of the free space is defined as a second internal logical unit with a second capacity, the specified second portion of the free space is defined as a third internal logical unit with a third capacity, each of the second capacity and the third capacity is defined in accordance with the first capacity designated by the logical unit expansion command so that a total capacity of the first internal logical unit and the second internal logical unit and third internal logical unit is equal to the first capacity, additionally the configuration management information is updated to indicate that the first portion and the second portion of the free space occupied by the second internal logical unit and the third internal logical unit,
   wherein the controller executes, after the internal logical unit creation process is executed, an internal logical units combining process in which the first internal logical unit, the second internal logical unit and the third internal logical unit are correlated and corresponded to the first external logical unit and provided to the computer as the expanded-first external logical unit with the capacity equal to the fps first capacity designated by the logical unit expansion command,
   wherein the controller transmits, to the management interface section, information about a result of the processes executed in response to the logical unit expansion command, and
   wherein a capacity of each of the plurality of internal logical units is variable, and the first capacity of the second internal logical unit is different from the second capacity of the third internal logical unit.

2. The storage system according to claim 1,
wherein the portion of the free space with a larger capacity is specified with a high priority.

3. The storage system according to claim 2,
wherein the controller transmits to the management interface section, information about a total free capacity being a total capacity of all of the portions of the free space, and an addition capacity to be specified by the expanded-capacity information is equal to or smaller than the total free capacity.

4. The storage system according to claim 3,
wherein the controller includes a cache memory area, accepts, before completion of the internal logical units combining process, a write command designating the first external logical unit from the computer, and when an address designated by the write command indicates a storage area corresponding to the second internal logical unit, temporarily stores data for writing in the cache memory area, and after completion of the internal logical units combining process, writes the data into the second internal logical unit in the expanded-first external logical unit created in the internal logical units combining process.

5. The storage system according to claim 4,
wherein when a storage area being a write destination in the second internal logical unit is to be written with data firstly after creation of the expanded-first external logical unit, the controller writes the data for writing after formatting the write-destination storage area.

* * * * *